United States Patent
McDonnell et al.

(10) Patent No.: US 11,489,791 B2
(45) Date of Patent: Nov. 1, 2022

(54) VIRTUAL SWITCH SCALING FOR NETWORKING APPLICATIONS

(71) Applicant: Intel Corporation, Santa Clara, CA (US)

(72) Inventors: Niall D. McDonnell, Limerick (IE); Bruce Richardson, Shannon (IE); John Mangan, Shannon (IE); Harry Van Haaren, Limerick (IE); Ciara Loftus, County Galway G (IE); Brian A. Keating, Shannon (IE)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 16/177,262

(22) Filed: Oct. 31, 2018

(65) Prior Publication Data
US 2019/0075063 A1    Mar. 7, 2019

(51) Int. Cl.
*G06F 13/10*   (2006.01)
*H04L 49/00*   (2022.01)
*G06F 9/54*    (2006.01)
*H04L 49/9005* (2022.01)

(52) U.S. Cl.
CPC ............. *H04L 49/70* (2013.01); *G06F 9/54* (2013.01); *G06F 13/105* (2013.01); *H04L 49/9005* (2013.01)

(58) Field of Classification Search
None
See application file for complete search history.

(56) References Cited

U.S. PATENT DOCUMENTS

2016/0077872 A1* 3/2016 Gu ................... G06F 9/545
                                                    718/102

OTHER PUBLICATIONS

Chaudron, Eelco, "Measuring and comparing Open vSwitch performance", Red Hat Developer, Online: https://ievelopers.redhat.eom/blog/2017/06/05/measuring-and-comparing-open-vswitch-performance#, Jun. 2017, 17 pages.
Conran, Matt, "Open vSwitch (OVS) Basics", Online: https://network-insight.net/2015/11/open-vswitch-ovs-basics/, Nov. 2015, 7 pages.
Finucane, Stephan and PFAFF, Ben, "Why Open vSwitch?", OpenvSwitch/ OVS, Online: https://github.com/apenvswitch/ovs/blob/master/Documentation/intro/why-ovs.rst, Dec. 2016, 3 pages.
Siller, Robin, "Open vSwitch with DPDK Overview", Intel, Online: https://www.intel.com/content/www/US/en/ieveloper/articles/technical/open-vswitch-with-dpdk-overview.html, Dec. 2016, 6 pages.

* cited by examiner

*Primary Examiner* — Scott C Sun
(74) *Attorney, Agent, or Firm* — Compass IP Law PC (57) ABSTRACT

Examples include a method of switching a packet by a virtual switch by receiving a system call to transmit a packet from a first application running in a first container on a first core, determining a destination for the packet, obtaining a buffer in an application memory space of the destination, copying the packet to the destination application memory space, and writing an entry for the packet to a queue assigned to the destination, the destination queue being in a queue manager. The packet may then be obtained by an entity at the destination.

27 Claims, 8 Drawing Sheets

VIRTUAL SWITCH SCALING FOR NETWORKING APPLICATIONS

BACKGROUND

Software containers based on the Linux® operating system (OS) are prevalent in cloud computing data center deployments. A container can include an application program. A Linux® container is an OS-level virtualization method for running multiple isolated Linux® systems on a host computing system using a single Linux® kernel. The Linux® kernel provides the functionality that allows limitation and prioritization of resources (processor, memory, block input/output (I/O), network, etc.) without the need for starting any virtual machines (VMs), and also the namespace isolation functionality that provides for complete isolation of an application's view of the operating environment, including process trees, networking, user identifiers (IDs), and mounted file systems. Containers can use user plane interfaces (such as shared memory packet interfaces like "memif") to bypass the Linux® kernel networking stack to send and/or receive packets. Containers can be used to avoid network interfaces that are tied to specific networking hardware device, such as network interface controllers (NICs).

Cloud deployments of network functions can be based on multiple composable micro-service-based applications running in containers. This creates infrastructure communication challenges for networking use cases which require high bandwidth and low latency inter-application communication.

Some solutions are based on software virtual switches such as Open vSwitch (OVS), a virtual switch licensed by the Linux® Foundation. These solutions rely on dedicating a number of compute processor cores as a centralized point for packet-based virtual switching from container to container and from container to physical I/O port. Packets are typically moved from switching cores to compute cores though well-known network interfaces such as "memif" or "virtio-net".

Inefficiency and limitations on scaling and latency are some of the disadvantages of current virtual switch solutions. These approaches are inefficient in that they reserve compute threads exclusively for switching, and these threads are unavailable for other purposes, whether the threads are actually busy or not. Scaling is non-linear and expensive due to the many-to-many queue relationships between switch cores and compute cores. Latency is an issue as packets are moved between compute cores to switch cores and vice versa. For high performance use cases, multiple switch cores are used, making it difficult to distribute traffic evenly, which further impacts latency as overworked cores become a bottleneck.

In VM-based network function virtual infrastructure (NFVi) environments, virtual switching has been identified as a bottleneck. In the networking cloud native use case the problems are exacerbated due to the more granular composable architecture.

DETAILED DESCRIPTION

Embodiments of the present invention provide a process to distribute the switching functions of a virtual switch into compute cores to scale performance linearly with the number of cores on the computing platform. Embodiments of the present invention also include a process to accelerate inter-core traffic that leverages a Hardware Queue Manager (HQM) to couple cores on the computing platform together and allow the cores to communicate directly with each other.

Embodiments of the present invention perform the virtual switching function by way of a system call in the same thread/core as an application in a container and, for inter-core traffic, to use a many-to-one connection (e.g., using the HQM) to link the compute cores running the applications directly to each other in a scalable manner.

A container needing to communicate calls a user plane application programming interface (API), which generates a system call in the same thread as the container. In one embodiment, the system call includes the packet header and the packet data to be sent. In another embodiment, multiple packets are included in one system call. Once entered via the system call, the process is in a protected trusted execution environment. A virtual switch lookup operation (e.g., a "fast path" operation) is performed and, if a match is found, an appropriate buffer in the address space of a destination is determined (these are recycled using the HQM), and then the packet is copied to that buffer. A pointer to the newly copied packet is sent to the HQM to a queue identifier (QID) associated with the intended destination thread. This pointer will eventually get written to the consumer queue, a buffer in memory uniquely readable by the destination thread. Since the pointer will be a virtual address in the context of the destination, the pointer can access the associated packet.

For reception, the container on the receive side obtains the packet from the assigned consumer queue and identifies the packet buffer for further processing. Exceptions are sent to a "slow path"; this function is also centralized like a "fast path" mechanism described herein, but results in the need for fewer cores in the present distributed switching model than in the traditional centralized model. Embodiments of the present invention distribute the fast path processing, but does nothing for the slow path because the instruction code base is too large to 'distribute' in the same manner.

Potential advantages of embodiments of the present invention include 1) no dedicated virtual switch cores are needed for fast path operations; 2) the distributed virtual switch scales well and scales automatically with the number of cores and containers in the computing platform; 3) better switching performance as packets stay in a middle level cache (ML); 4) less mesh traffic between cores is generated due to higher mid-level cache (MLC) utilization; and 5) lower latency due to a simpler packet interface, more synchronous operation and fewer thread switches.

Figure 1:
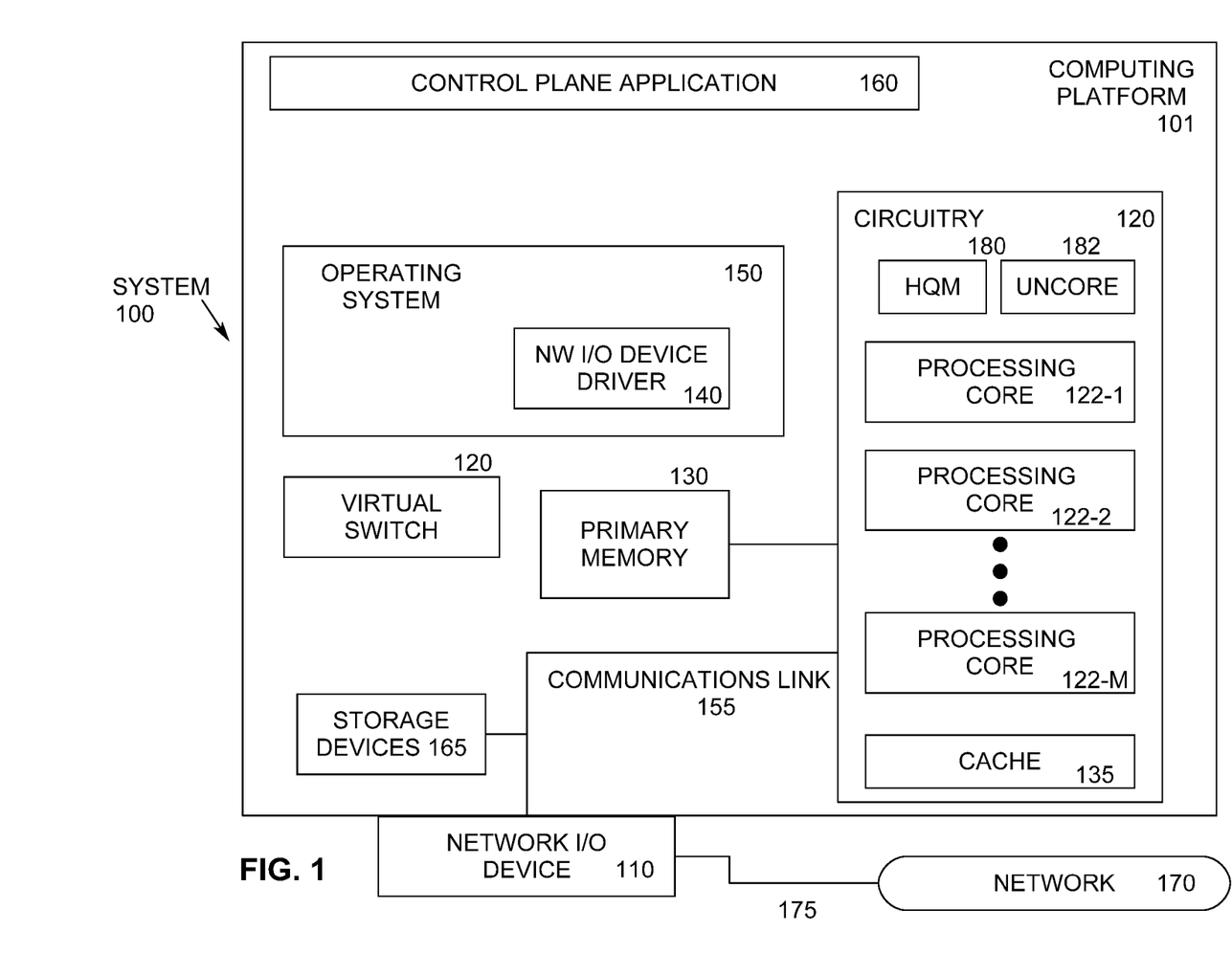
FIG. 1 illustrates an example computing system.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through at least one network I/O device 110 (e.g., a network interface controller (NIC)) having one or more ports connected or coupled to network communication channel 175. In an embodiment, network communication channel 175 includes a PHY device (not shown). In an embodiment, network I/O device 110 is an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, network (NW) I/O device driver 140, operating system (OS) 150, at least one control plane application 160, and one or more storage devices 165. In one embodiment, OS 150 is Linux™. In another embodiment, OS 150 is Windows® Server. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In at least one embodiment, application 160 is a packet processing application operating in user mode. Computing platform 101 includes virtual switch 120 to send and receive packets to and from destinations external to computing platform 101 or internal to computing platform 101 (e.g., between containers/cores). In an embodiment, virtual switch 120 operates in kernel mode.

In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG). In some examples, operating system 150, NW I/O device driver 140, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-$m$, where "m" is any positive whole integer greater than 2. In an embodiment, OS 150, NW I/O device driver 140, virtual switch 120, and application 160 are executed by one or more processing cores 122-1 to 122-$m$.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 101 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

Uncore 182 describe functions of a processor that are not in processing cores 122-1, 122-2, . . . , 122-$m$, but which are closely connected to the cores to achieve high performance. Cores contain components of the processor involved in executing instructions, including the arithmetic logic unit (ALU), the floating-point unit (FPU) and level one and level two caches. In contrast, in various embodiments, uncore 182 functions include interconnect controllers, a level three cache, a snoop agent pipeline, an on-die memory controller, and one or more I/O controllers. In an embodiment, uncore 182 is resident in circuitry 120. In an embodiment, uncore 182 includes last level cache 135.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

Computing platform 101 includes hardware queue manager (HQM) 180 to assist in managing queues of data units. In an embodiment, the data units are packets transmitted to and/or received from network I/O device 110, and packets transferred between cores. In another embodiment, the data units include timer events. In an embodiment, HQM 180 is part of circuitry 120. In another embodiment, HQM 180 is part of uncore 182. In another embodiment, HQM 180 is part of network I/O device 110.

Figure 2:
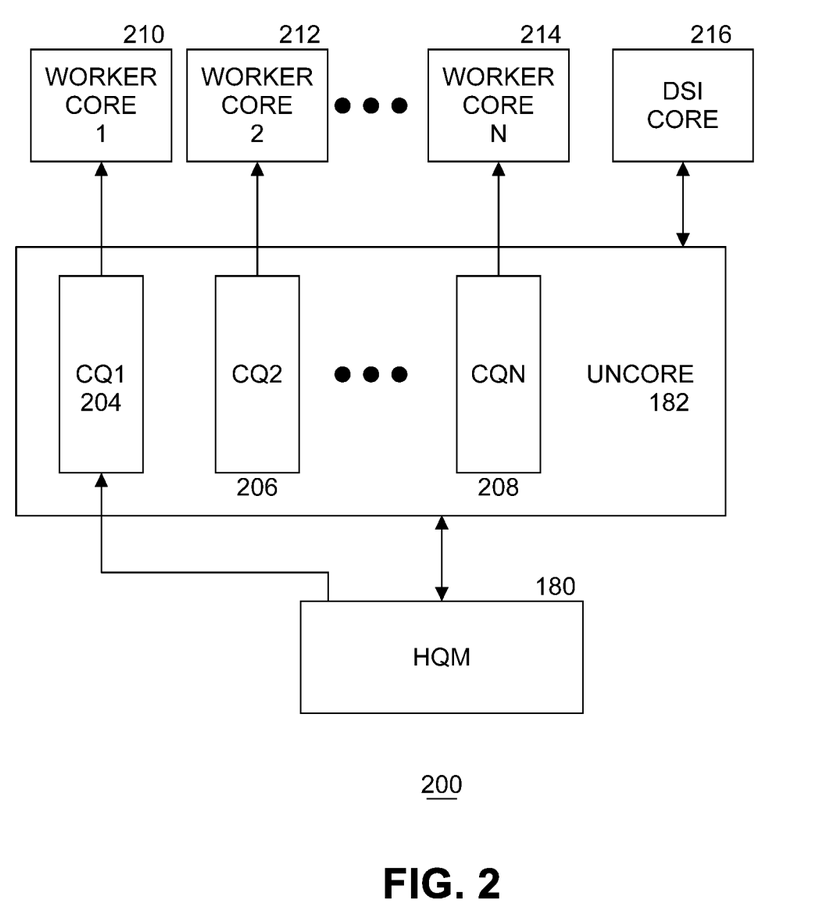
FIG. 2 illustrates an example arrangement of processing cores.

FIG. 2 illustrates an example arrangement of processing cores. Packet processing applications (such as control plane application 160) typically provision a number of "worker" processing threads running on processor cores (called "worker cores") to perform the processing work of the applications. Worker cores consume packets from dedicated queues which in some scenarios is fed by one or more network interface controllers (NICs), I/O controllers, or other worker cores.

Embodiments of the present invention use a loop running on a receive (Rx) device specific interface (DSI) core 216 to control processing of received packets. In an embodiment, DSI core 216 makes network I/O device 110 look like a software agent to HQM 180. For traffic coming from network I/O device 110, DSI core 216 converts the network I/O descriptors to HQM format and sends them to HQM 180 to the correct destination (the destination is decided by the DSI core, or, preferably, network I/O device 110, if the network I/O device is capable). The destination core hence gets outbound traffic from HQM 180, whether that traffic came from another core, or network I/O device 110. For traffic going out to network I/O device 110 from worker cores 210, 212, . . . 214, DSI core 216 aggregates such traffic onto the DSI core(s) for transmitting to network I/O device 110. This means there is no need to provision a network I/O device transmit queue for every worker core or run network I/O device driver code on every worker core.

DSI core 216 accepts descriptors (e.g., metadata) for incoming packets and enqueues the packet descriptors in queues in HQM 180. In embodiments of the present invention, DSI core 216 and worker cores 210, 212, . . . 214 are processing cores 122-1, 122-2, . . . 122-$m$ as described FIG. 1. In one embodiment, worker cores go into and out of sleep state using a MWAIT instruction (for computing platforms having an Intel Architecture instruction set architecture (ISA)) when no work is available.

In an embodiment, uncore 182 includes a plurality of consumer queues CQ 1 204, CQ 2 206, . . . CQ N 208, where N is a natural number, stored in cache 135. Each consumer queue stores zero or more blocks of metadata. In an embodiment, a block of metadata is a packet descriptor including information describing a packet and a pointer to the packet data. In one embodiment, there is a one to one correspondence between each worker core and a consumer queue. For example, worker core 1 210 is associated with CQ 1 204, worker core 2 212 is associated with CQ 2 206, and so on until worker core N 214 is associated with CQ N 208. However, in other embodiments there may be a plurality of consumer queues per worker core. In yet another embodiment, at least one of the worker cores is not associated with a consumer queue. The sizes of the consumer queues may all be the same or may be different in various embodiments. The sizes of the consumer queues are implementation dependent. In at least one embodiment, the consumer queues store metadata describing packets, but not the packets themselves (since the packets are stored in one or more of primary memory 130, cache 135, and storage devices 165 while being processed after receipt from network I/O device 110).

HQM 180 distributes packet processing tasks to enabled worker cores 210, 212, . . . 214 by adding packet descriptors to consumer queues CQ 1 204, CQ 2 206, . . . CQ N 208 in uncore 182. Disabled worker cores are not allocated any traffic when disabled and can enter low power states semi-statically, or be switched to other duties.

In an embodiment, processing proceeds as follows. DSI core 216 enqueues packet descriptors to HQM 180 via uncore 182. HQM 180 distributes (i.e., load balances) packet descriptors to active consumer queues CQ1 204, CQ 2 206, . . . CQ N 208 in uncore 182. Worker cores 210, 211, . . . 214 get packet descriptors from corresponding consumer queues for packet processing. Worker cores with nothing to do (i.e., there are no packet descriptors in their consumer queues to be processed), go to sleep.

Figure 3:
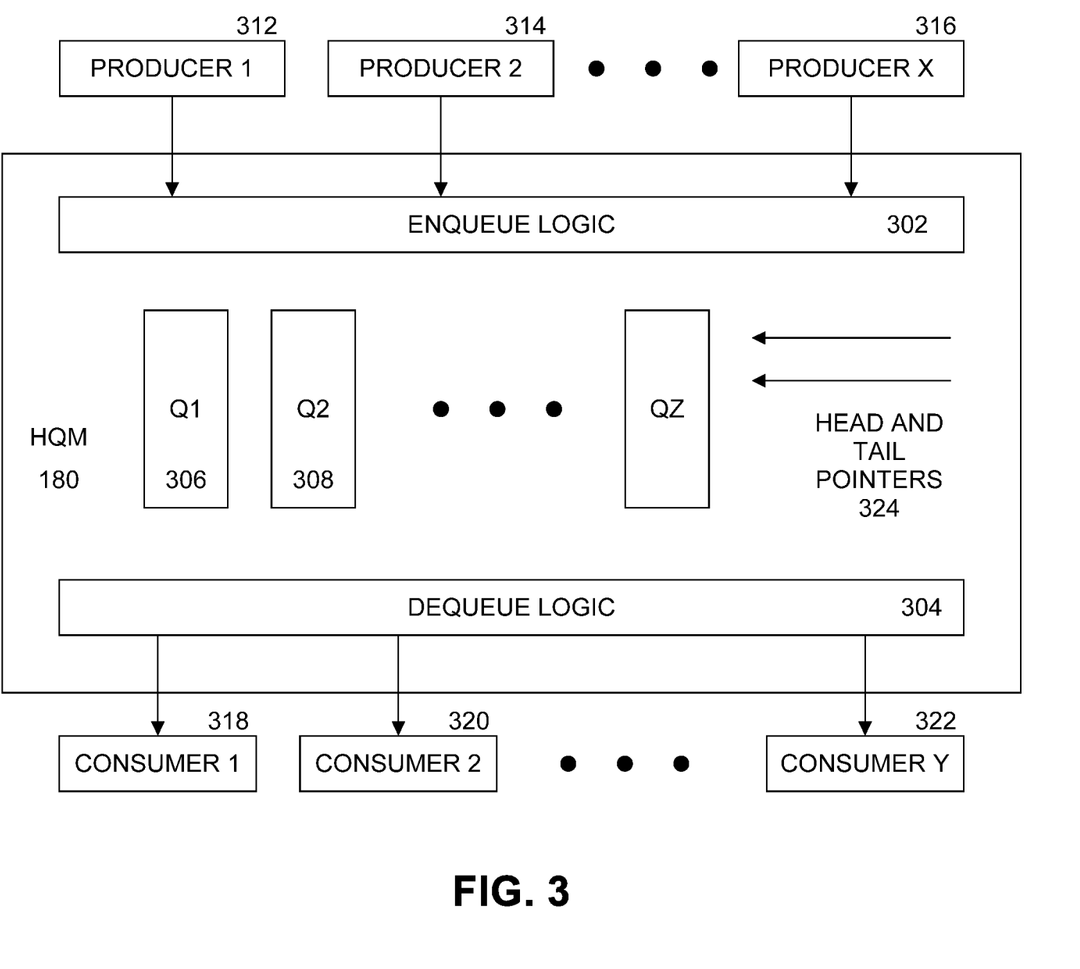
FIG. 3 illustrates an example hardware queue manager (HQM).

FIG. 3 illustrates an example hardware queue manager (HQM) 180. HQM provides queue management offload functions. HQM 180 provides a hardware managed system of queues and arbiters connecting producers and consumers. HQM 180 includes enqueue logic circuitry 302 to receive data (such packet descriptors for example) from a plurality of producers, such as producer 1 312, producer 2 314, . . . producer X 316, where X is a natural number. Enqueue logic circuitry 302 inserts the data into one of the queues internal to HQM called Q1 306, Q2 308, . . . QZ 310, where Z is a natural number, for temporary storage during load balancing operations. HQM 180 uses a plurality of head and tail pointers 324 to control enqueuing and dequeuing of data in queues Q1 306, Q2 308, . . . QZ 310. HQM 180 includes dequeue logic circuitry 304 to remove the data from a queue and transfer the data to a selected one of consumer 1 318, consumer 2 320, . . . consumer Y, where Y is a natural number. In an embodiment, the values for X, Y, and Z are different, any one or more producers write to more than one queue, any one or more consumers read from more than one queue, and the number of queues is implementation dependent. Further details on the operation of HQM 180 are described in the commonly assigned patent application entitled "Multi-Core Communication Acceleration Using Hardware Queue Device" filed Jan. 4, 2016, published Jul. 6, 2017 as US 2017/0192921 A1.

Figure 4:
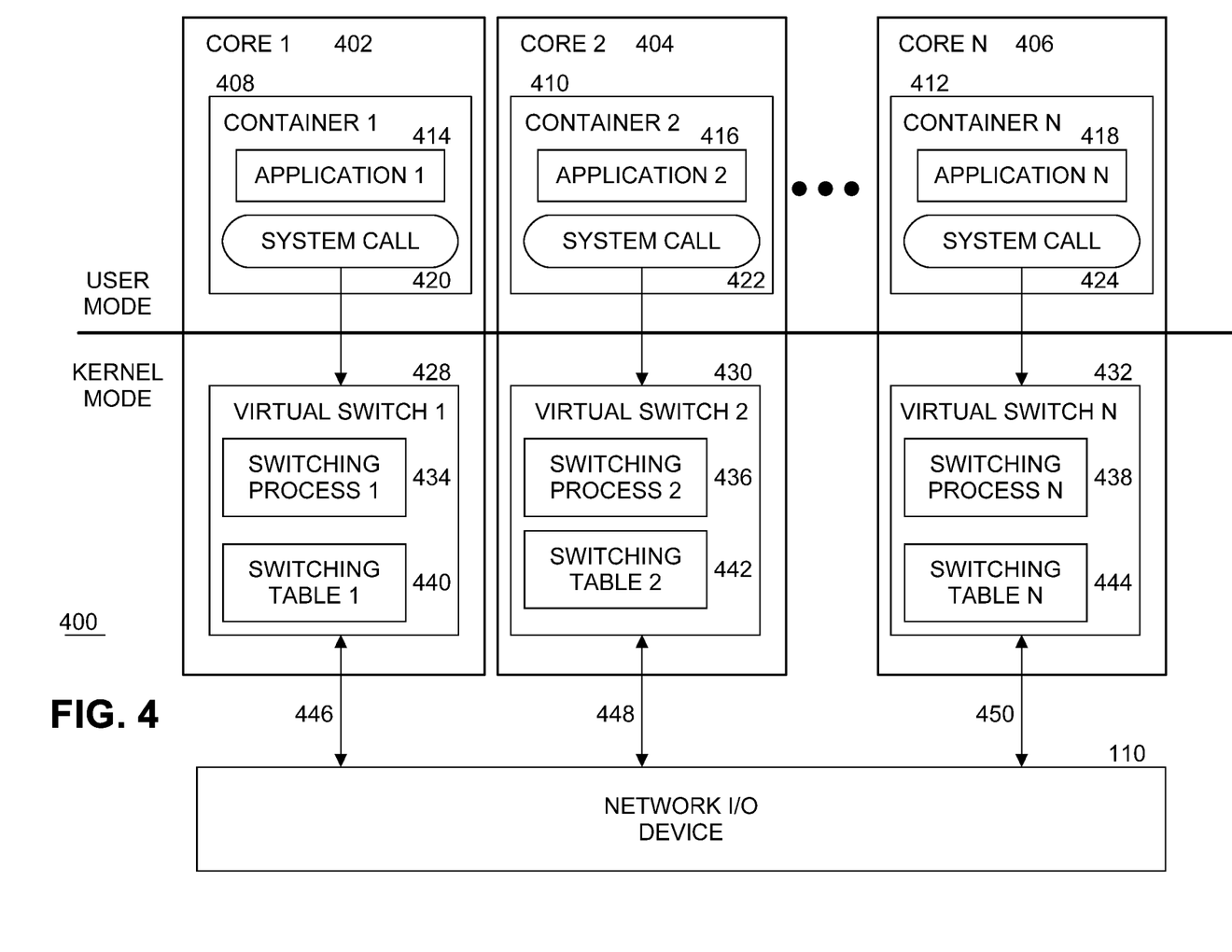
FIG. 4 illustrates an example arrangement of cores with virtual switches and containers.

FIG. 4 illustrates an example arrangement 400 of virtual switches and cores with containers. In a computing platform having multiple processing cores, core 1 402, core 2 404, . . . core N 406, where N is a natural number, are executing programs in user mode. Each core runs a container in user mode. In an embodiment, the container is a Linux® container, although other OSs and different types of container may also be used. For example, core 1 402 executes container 1 408, core 2 executes container 2 410, . . . core N 406 executes container 412. Each container includes an application. For example, container 1 408 includes application 1 414, container 2 410 includes application 2 416, . . . container N 412 includes application N 418. In an embodiment, applications 1, 2, . . . N are packet processing applications. In another embodiment, applications 1, 2, . . . N are any application programs for sending and receiving data. In an embodiment, a container is executed by one thread on a core. In another embodiment, a container is executed by more than one thread on a core. In a further embodiment, a container is executed by more than one thread, with each thread being executed on a different core.

Arrangement 400 include a plurality of virtual switches running in kernel mode to coordinate the switching of data units such as packets between network I/O device 110 and containers (e.g., container 1 408, container 2 410, . . . container N 412) being executed by cores (e.g., core 1 402, core 2 404, . . . core N 406) and between containers. Each core runs an instance of a virtual switch. For example, core 1 402 runs virtual switch 1 428, core 2 404 runs virtual switch 2 430, . . . core N 406 runs virtual switch N 432. Virtual switches are assumed to be trusted because of being executed in kernel mode. Network I/O device 110 receives packets and forwards the packets via lines 446, 448, . . . 450 to virtual switches 428, 430, . . . 432, respectively.

Applications send packets to network I/O device 110 for transmission outside of the computing platform (i.e., "external I/O") via virtual switches. For example, application 1 414 in container 1 408 makes a system call 420 to virtual switch 1 428. Virtual switch 1 428 determines that the packet is to be sent outside the computing platform. Virtual switch 1 428 therefore sends the metadata to HQM 180 to a consumer queue (CQ) associated with a DSI core. The metadata gets written to a CQ visible to the DSI core, which would read the metadata and transmit the associated packet.

Virtual switches 428, 430, . . . 432 also send and receive packets between containers (e.g., "internal I/O") running on different cores. That is, in an embodiment, any container 408, 410, . . . 412 can send and/or receive a packet from any other container using virtual switches 428, 430, . . . 432. For example, container 1 408 running on core 1 402 can send a packet to container 2 410 running on core 2 404 using virtual switch 1 428. Container 2 410 uses virtual switch 2 430 to receive the packet.

Applications get packets from assigned queues in HQM 180 (not shown in FIG. 4). To get packets from CQs, a system call is not needed because the CQ can be mapped directly to the user space of the application. This is advantageous because system calls are expensive and the application should not waste processing cycles polling an empty CQ. In at least one embodiment, the system call is used to replenish memory buffers that the application removed from the system. In this embodiment, the application is not trusted to not overflow the system by returning too many buffers (since this would adversely affect other applications). In this case buffer return can be done after the receiving operation. In an embodiment, the buffer return is done as part of the transmit system call (in this way only a single system call is required for each batch of packets).

Each virtual switch includes an instance of a switching process and an instance of a switching table. For example, virtual switch 1 428 includes switching process 1 434 and switching table 1 440, virtual switch 2 430 includes switching process 2 436 and switching table 2 442, . . . virtual switch N includes switching process N 438 and switching table N 444. A switching process analyzes an incoming packet and determines where the packet should be routed to (i.e., the switching process makes the switching decisions to determine a destination for each packet (either an internal destination such as a container or an external destination such as via network I/O device 110).

In an embodiment, a switching table includes one or more sub-tables. A sub-table provides actions to be performed based at least in part on specific fields. For example, a sub-table might be specific to the destination IP address and TCP port number. For example, a 'flow entry' in the table might indicate:

Match (Destination IP (DIP)=123.345.*.*
&& Destination TCP Port (DTP)=0-99):
Send the packet to port #5
Increment the time to live (TTL) field
Insert a VLAN tag of 0x4455

The sub-table may contain any number of such entries, each matching on combinations of DIP and DTP, each with a set of actions to be performed. Other tables (if they exist) may focus on different combinations of fields or subfields. If the packet matched this sample entry, switching process would associate port #5 in the example above with an address space (switching processing would copy the packet to a buffer from that address space) and an HQM QID (the switching process would send the metadata to that QID).

For transmitting packets to destinations outside of computing platform 101, switch processing includes parsing, classifying and performing a lookup in a switching table specific to a container's I/O port (e.g., in network I/O device 110). If a flow entry is found, the assigned actions are performed. The packets are then dispatched to the network I/O device 110. For receiving packets from sources outside of the computing platform, network I/O device 110 forwards packets to the DSI core.

The network I/O device receive packet descriptor handling is done by the DSI core. There are two options. If the network I/O device is capable, the network I/O device will 'switch' the inbound packet to a receive ring (RxRing, not shown in FIG. 4) associated with an application. The receive ring will be provisioned (by DSI core 216) with buffers appropriate to that application address space. The DSI core will service the ring and 'convert' the descriptors to HQM format metadata. The DSI core will then enqueue the metadata to HQM 180 for the correct destination. If the network I/O device is not capable of switching to the initial application, more processing is required by the DSI core, because the switching has to occur on these cores. In this case, the network I/O device sends all traffic to one ring, using kernel buffers. The DSI core switches and copies the packet to the correct destination, before creating HQM metadata and enqueuing the packet to HQM 180.

Virtual switches 428, 430, . . . 432 running in kernel mode perform switching functions as an extension of applications 414, 416, . . . 418 while at the same time maintaining isolation from other, potentially untrusted applications running on cores 402, 404, . . . 406, respectively. For a user mode application (such as application 1 402, application 2 404, . . . application N 406), the basis for this security relies on making system calls 420, 422, . . . 424 from the application's container to virtual switch code that is in a kernel protected environment on the same core with the same caching locality as the calling application.

Figure 5:
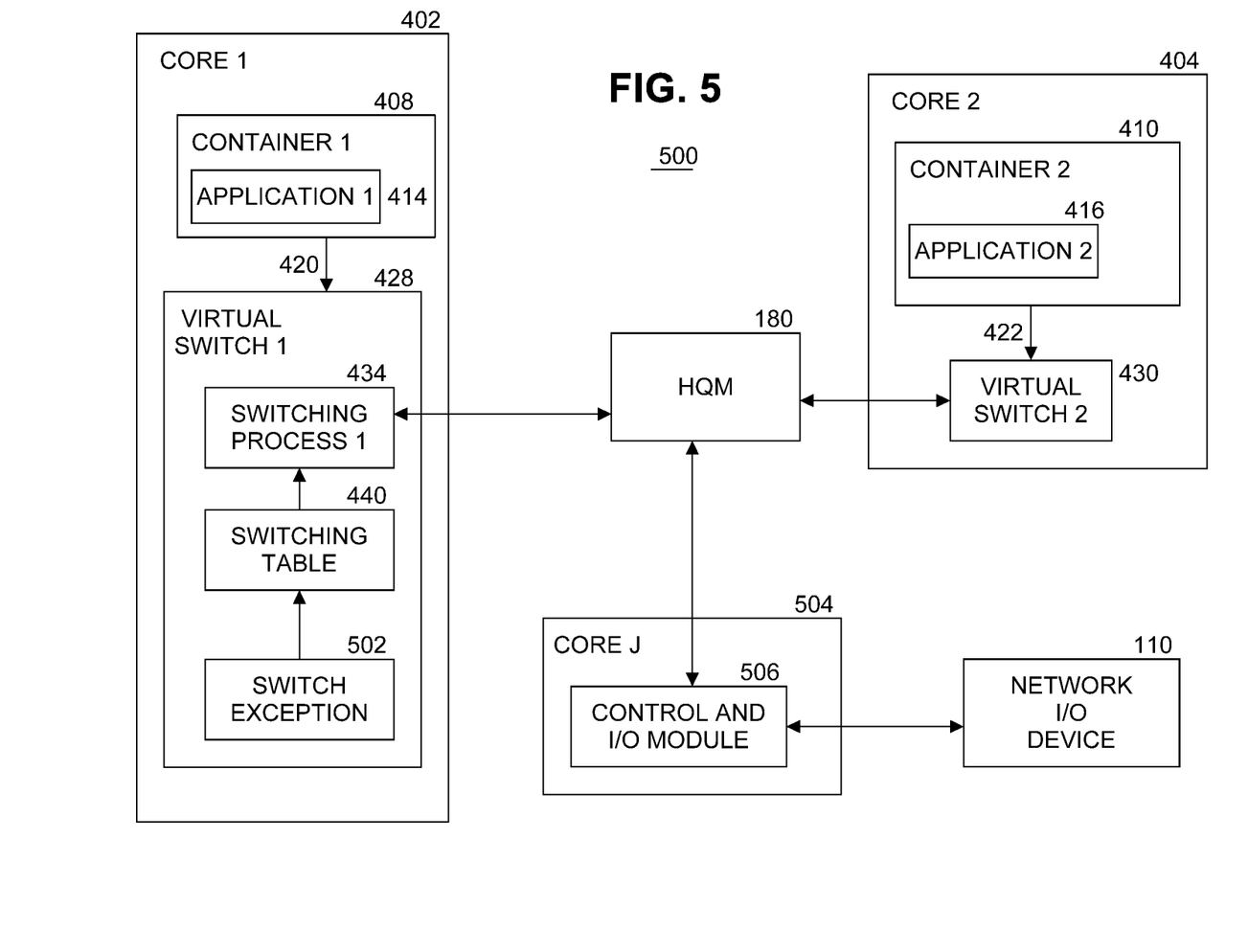
FIG. 5 illustrates an example arrangement of an HQM coupled to a plurality of virtual switches.

FIG. 5 illustrates an example arrangement of an HQM coupled to a plurality of virtual switches. In an embodiment, the use of system calls is extended using HQM 180 to allow for scaling inter-container packet communications. Implementation of the system call performs a similar classification and switching function. The packet is copied to a destination buffer and submitted to a destination queue in HQM 180 assigned to the destination thread. In an embodiment, there are a plurality of HQM devices in computing platform 101, and this might involve selecting between the plurality of HQMs. In an embodiment, multiple transmit packet requests can be handled together in a batch.

In the example of FIG. 5, core 1 402 includes container 1 408 running application 1 414 and virtual switch 1 428 including switching process 1 434 and switching table 440 as shown in FIG. 4. In one example, application 1 414 is to send a packet to application 2 416 running in container 2 410 on core 2 404 (i.e., an internal I/O request). Application 1 414 makes system call 420 to virtual switch 1 428 to send the packet. Virtual switch 1 428 adds metadata for the packet to a consumer queue (CQ) in HQM 180 that is assigned to application 2 416. CQs are identified by queue identifiers (QIDs). Application 2 416 then gets the packet metadata from the assigned CQ in HQM 180.

In some cases, a switch exception 502 (i.e., an error) may occur when virtual switch 1 428 processes the packet. Exception packet metadata is added to a CQ assigned to control and I/O module 506 in a core J 504 of computing platform, where J is a number from 1 to N. In some embodiments, the DSI cores may be dedicated cores. In other embodiments the DSI function may run on the same cores as the exception path (i.e., core J 504). But in both cases, DSI core functions are centralized, dedicated resources, and are not distributed across cores.

Control and I/O module 506 gets the packet metadata from the assigned CQ in HQM and attempts to resolve the exception. If the exception is resolved, control and I/O module 506 adds the packet metadata to the CQ in HQM assigned to the correct destination (such as application 2 416, for example).

In another example, application 1 414 is to send a packet to a destination outside of the computing platform via network I/O device 110 (i.e., an external I/O request). Application 1 414 makes system call 420 to virtual switch 1 428 to send the packet. Switching process 1 434 in virtual switch 1 428 adds metadata for the packet to a CQ in HQM 180 that is assigned to control and I/O module 506 of core J 504. Control and I/O module 504 then gets the packet metadata from the assigned CQ in HQM and forwards the packet to network I/O device 110 for external transmission. In this instance, Core J operates as a DSI core.

Figure 6:
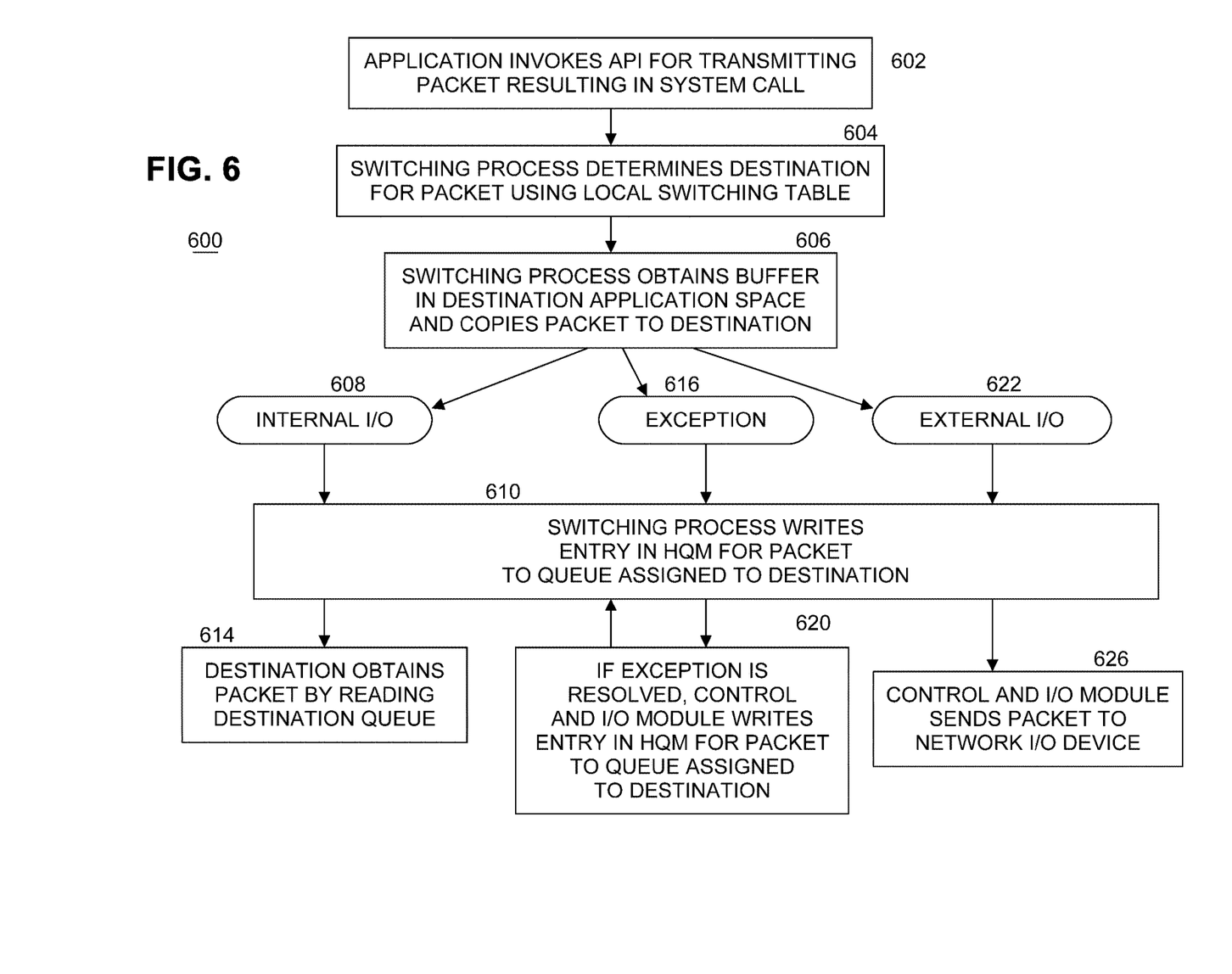
FIG. 6 illustrates a flow diagram of using an HQM for scaling inter-core traffic.

FIG. 6 illustrates a flow diagram 600 of using an HQM 180 for scaling inter-core traffic. When application 414 has a packet to send, at block 602 the application invokes an API in container 408 to transmit the packet to a destination. This results in a system call 420 being made to the virtual switch 428 running in kernel mode on the same core 402 as container 408. At block 604, switching process 434 of virtual switch 428 determines destination information for the packet using the switching table 440 of the virtual switch 428 (e.g., the local switching table on the same core as the container). At block 606, switching process 434 obtains a buffer in an application memory space of the destination and copies the packet to that memory space. Depending on the destination, the destination application memory space may be in (and associated with) a different container running on a different core (such as container 2 410 of core 2 404), a module running on a different core (such as control and I/O module 506 running on core J 504), or in network I/O device 110. Generally, each container has its own memory space.

In an embodiment, the destination provides the buffer from a pool of buffers in the destination's application memory space. HQM 180 supplies the empty buffers as well as the actual packets. In an embodiment, a single direct HQM queue (and corresponding CQ) is dedicated for each address space. This CQ is mapped to kernel space so all trusted components can see the CQ. Any trusted component requiring a buffer from the address space has to read that CQ. Since the CQ is shared, an atomic semantic is required (this detail is a performance/practicality tradeoff) to read the CQ. If the CQ is empty, no buffers are available, and the packet should be dropped. An application that receives packets must replenish the system with an equivalent number of empty buffers. If the application does not, the application will starve its own buffers and will cause traffic destined for the application to be dropped. The application does the replenishment by enqueuing pointers to the buffers to the queue that is allocated to the application.

There are two types of destinations for a packet: internal I/O 608 and external I/O 622. Additionally, if there are one or more errors encountered by switching process 1 434 when switching the packet, an exception handling path 616 is taken. At block 610, switching process 1 434 writes an entry in HQM 180 for the packet to a CQ assigned to the destination (whether internal or external). In an embodiment, the queue entry includes packet metadata and points to the location of the copied packet in the destination's memory space. In an embodiment, the process described in FIG. 6 may be occurring concurrently on many cores, which could have executed the system call at around the same time. In some instances, cores A, B might both be trying to send packets to core C. The other sources can include other trusted components and an advantage of using the HQM is that the HQM allows for a many-to-one send operation to occur efficiently (cores A and B do not need to know about each other, and core C does not need to know what cores can send to core C).

The queue entries (equivalently, descriptors, or metadata) are initially held internally in a HQM queue. In one embodiment, this queue is embodied in static random-access memory (SRAM) within the HQM. The queue is specified by the trusted component as part of an enqueue operation. When the HQM reaches the head of that internal queue, the HQM writes to the corresponding CQ, which is a circular buffer (ring) in system memory. For this "direct" type of traffic there is a one to one correspondence between an HQM queue and a CQ. The CQ buffer is in the memory space of the destination thread, so the CQ can be read directly by that thread.

At block 614, the destination obtains the packet by reading the destination's CQ to get the packet metadata, which points to the location of the packet copied into the destination's memory space. The destination can then process the packet as needed.

At block 616, if an exception occurred during switching, the switching process sends the metadata to HQM 180 specifying a queue that the HQM knows will be owned by the control I/O module 506. This process is similar to internal I/O case, except with an exception no packet copy is performed (the destination address space is unknown; however, the packet may be copied to a kernel buffer in some cases). In any case, the metadata points to either the original packet or the freshly copied kernel buffer.

Control and I/O module 506 attempts to resolve the exception. Control & I/O module 506 has a slow execution path that determines how the packet should be switched. In an embodiment, this involves a larger and more comprehensive set of tables than switching table 440 in a virtual switch. Once the control I/O module has completed the operation, the control I/O module may decide this is a new 'flow' and add an entry to one of the fast path tables described above. Future packets in the same flow will then not cause exceptions.

If the exception is resolved, at block 620 control and I/O module writes an entry in HQM 180 for the packet to the queue assigned to the now resolved destination. Processing continues with block 610.

At block 622, if the destination indicates external I/O, processing continues with block 626. At block 626, control and I/O module 626 sends the packet to network I/O device 110 for transmission outside of the computing platform.

Figure 7:
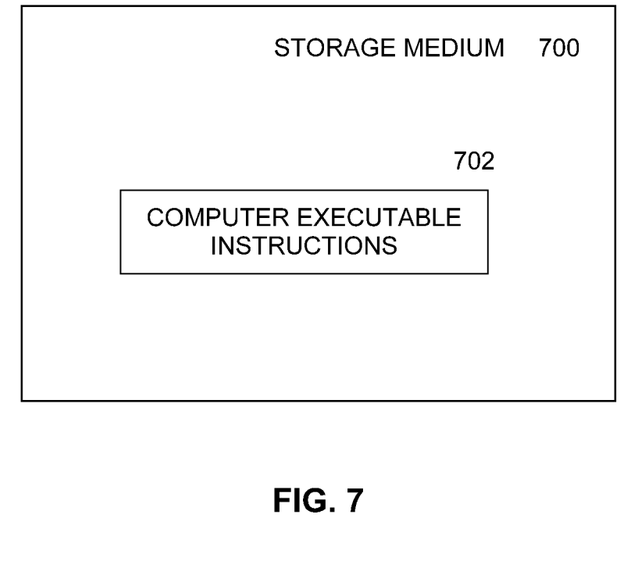
FIG. 7 illustrates an example of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions 702 to implement logic flow 600 of FIG. 6, respectively. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
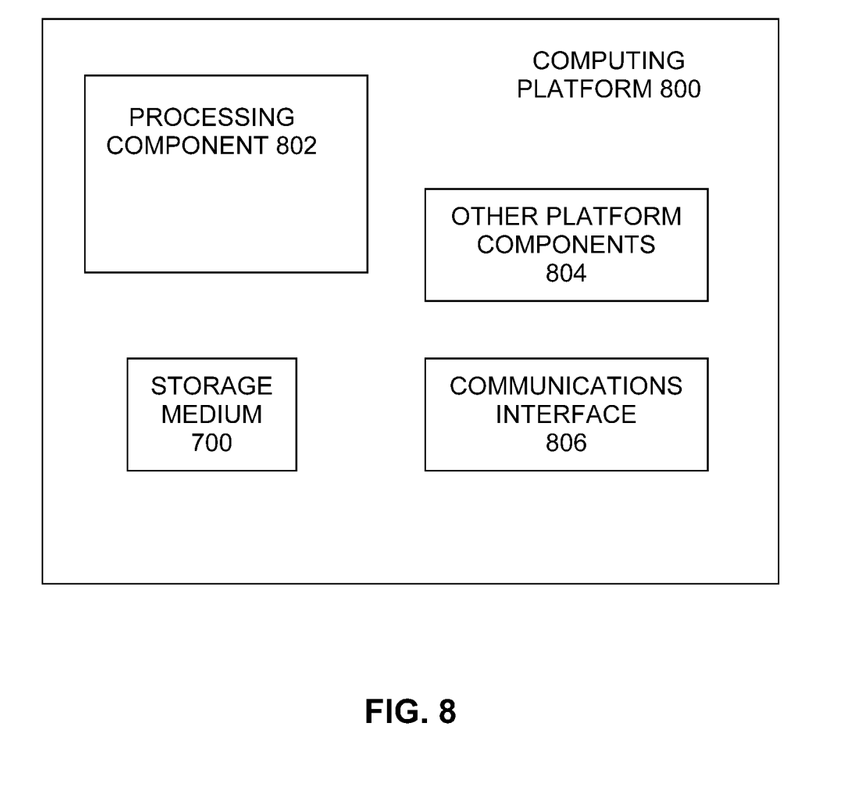
FIG. 8 illustrates another example computing platform.

FIG. 8 illustrates an example computing platform 800. In some examples, as shown in FIG. 8, computing platform 800 may include a processing component 802, other platform components 804 and/or a communications interface 806.

According to some examples, processing component 802 may execute processing operations or logic for instructions stored on storage medium 700. Processing component 802 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 804 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 806 may include logic and/or features to support a communication interface. For these examples, communications interface 806 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 800, including logic represented by the instructions stored on storage medium 700 may be implemented using any combination of discrete circuitry, ASICs, logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a system call to transmit a packet from a first application running in a first container on a first core;
   determining a destination for the packet;
   obtaining a buffer in an application memory space of the destination;
   copying the packet to the destination application memory space; and
   writing an entry for the packet to a queue assigned to the destination, the destination queue being in a queue manager.

2. The method of claim 1, wherein when the destination indicates internal input/output (I/O), comprising the queue manager writing entries to the destination queue.

3. The method of claim 2, wherein the first application runs in the first container in the first core in user mode, and the determining, obtaining, copying, and writing are processed by a virtual switch running on the first core in kernel mode.

4. The method of claim 3, comprising determining the destination by using a switching table in the virtual switch.

5. The method of claim 3, comprising reading the entry in the destination queue to obtain the packet by a second application running in a second container on a second core, the destination application memory space being associated with the second container.

6. The method of claim 5, comprising when the destination cannot be determined, attempting to determine the destination by a control and I/O module running on a third core, and, when the destination is determined by the control and I/O module, writing an entry for the packet to a queue assigned to the destination, the destination queue being in the queue manager.

7. The method of claim 1, wherein when the destination indicates external input/output (I/O), comprising sending, by a control and I/O module running on a third core, the packet to a network I/O device.

8. At least one non-transitory tangible machine-readable medium comprising a plurality of instructions that in response to being executed by a processor having a plurality of cores cause the processor to:
   receive a system call to transmit a packet from a first application running in a first container on a first core;
   determine a destination for the packet;
   obtain a buffer in an application memory space of the destination;
   copy the packet to the destination application memory space; and
   write an entry for the packet to a queue assigned to the destination, the destination queue being in a queue manager.

9. The at least one tangible machine-readable medium of claim 8, wherein when the destination indicates internal input/output (I/O), comprising the queue manager writing entries to the destination queue.

10. The at least one tangible machine-readable medium of claim 9, wherein the first application runs in the first container in the first core in user mode, and the determining, obtaining, copying, and writing are processed by a virtual switch running on the first core in kernel mode.

11. The at least one tangible machine-readable medium of claim 10, comprising instructions, stored thereon, that if executed by the processor, cause the processor to determine the destination by using a switching table in the virtual switch.

12. The at least one tangible machine-readable medium of claim 10, comprising instructions, stored thereon, that if executed by the processor, cause the processor to read the entry in the destination queue to obtain the packet by a second application running in a second container on a second core, the destination application memory space being associated with the second container.

13. The at least one tangible machine-readable medium of claim 12, comprising instructions, stored thereon, that if executed by the processor, cause the processor to: that when the destination cannot be determined, to attempt to determine the destination by a control and I/O module running on a third core, and, when the destination is determined by the control and I/O module, to write an entry for the packet to a queue assigned to the destination, the destination queue being in the queue manager.

14. The at least one tangible machine-readable medium of claim 8, wherein when the destination indicates external input/output (I/O), comprising instructions, stored thereon, that if executed by the processor, cause the processor to send, by a control and I/O module running on a third core, the packet to a network I/O device.

15. A system comprising:
a queue manager to store queues; and
a virtual switch to receive a system call to transmit a packet from a first application running in a first container on a first core, determine a destination for the packet, obtain a buffer in an application memory space of the destination, copy the packet to the destination application memory space, and write an entry for the packet to a queue assigned to the destination, the destination queue being in the queue manager.

16. The system of claim 15, wherein when the destination indicates internal input/output (I/O), comprising the queue manager to write entries to the destination queue.

17. The system of claim 16, wherein the first application runs in the first container in the first core in user mode, and the determine, obtain, copy, and write are processed by the virtual switch running on the first core in kernel mode.

18. The system of claim 17, the virtual switch comprising a switching table used to determine the destination.

19. The system of claim 17, comprising a second application running in a second container on a second core to read the entry in the destination queue to obtain the packet, the destination application memory space being associated with the second container.

20. The system of claim 19, comprising a control I/O module running on a third core that when the destination cannot be determined, the control I/O module to attempt to determine the destination, and, when the destination is determined by the control and I/O module, to write an entry for the packet to a queue assigned to the destination, the destination queue being in the queue manager.

21. The system of claim 15, comprising a control I/O module running on a third core that when the destination indicates external input/output (I/O), to send the packet to a network I/O device.

22. The method of claim 2, wherein
the first application runs in the first container in the first core,
the determining, obtaining, copying, and writing are processed by a virtual switch running on the first core, and
the virtual switch comprises Open vSwitch (OVS).

23. The at least one tangible machine-readable medium of claim 9, wherein
the first application runs in the first container in the first core,
the determining, obtaining, copying, and writing are processed by a virtual switch running on the first core, and
the virtual switch comprises Open vSwitch (OVS).

24. At least one non-transitory machine-readable medium comprising a plurality of instructions that in response to being executed by at least one processor, cause the at least one processor to:
execute a virtual switch to perform (a) communications of packets between applications or (b) transmission of packets from an application by a network interface controller to a destination, by configuring a queue manager to allocate one or more queues for metadata associated with the communications or transmission of packets.

25. The at least one non-transitory machine-readable medium of claim 24, wherein the virtual switch comprises Open vSwitch (OVS).

26. The at least one non-transitory machine-readable medium of claim 24, wherein the metadata comprises at least one packet descriptor.

27. The at least one non-transitory machine-readable medium of claim 24, wherein:
for (a) communications of packets between applications, the one or more queues are assigned to a destination application and
for (b) transmission of packets from an application by a network interface controller to a destination, the one or more queues are assigned to the network interface controller.

* * * * *